Feb. 16, 1937.  R. E. ASHLEY  2,071,222
SKI MAT
Filed Feb. 25, 1936
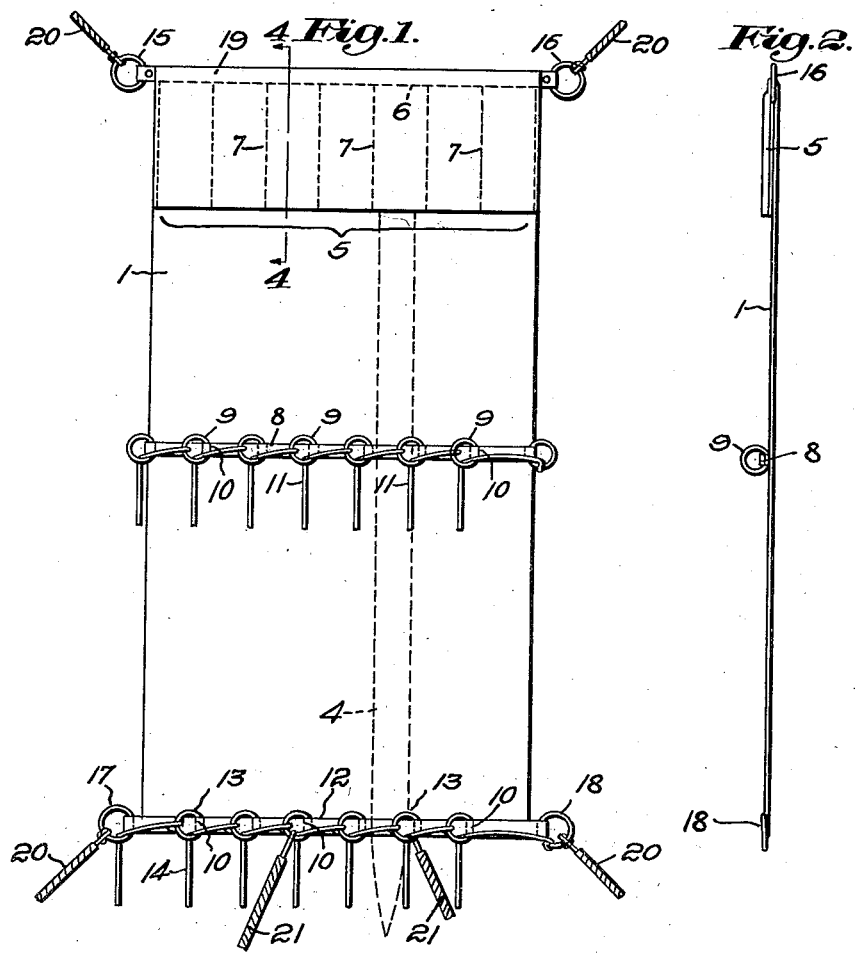
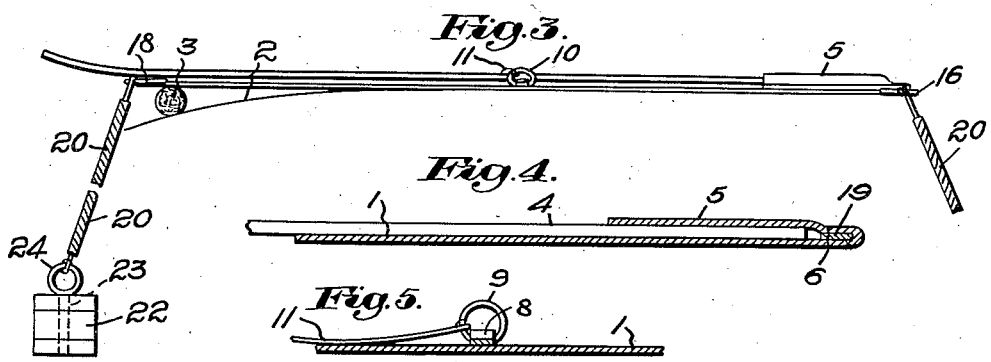
Inventor:
Raymond E. Ashley.
By Emery, Booth, Townsend, Miller and Weidner.
Attys Patented Feb. 16, 1937

2,071,222

UNITED STATES PATENT OFFICE 2,071,222

SKI MAT

Raymond E. Ashley, Waban, Mass.

Application February 25, 1936, Serial No. 65,580

2 Claims. (Cl. 224—29)

This invention particularly relates to a complete and self-contained article of manufacture adapted to be detachably secured to the top of an automobile or other vehicle for the transportation of various objects, as, for example, skis, which cannot readily be carried inside the vehicle and which, if secured directly to the outside of the automobile without suitable protection, will result in injury both to the automobile and to the objects being transported.

In order that the principle of the invention may be readily understood, I have disclosed a single embodiment thereof in the accompanying drawing, wherein—

Fig. 1 is a plan view of the so-called ski mat or sheet-like member adapted to be detachably secured to the top of a vehicle;

Fig. 2 is a longitudinal edge elevation thereof;

Fig. 3 is a longitudinal section thereof indicating the same in position upon an automobile top;

Fig. 4 is an enlarged longitudinal section of one end of the ski mat; and

Fig. 5 is a detail to show the preferred manner of securing one of the rings in position.

An increasingly large percentage of travel in the United States is done by automobiles, and those who make lengthy trips or carry camping equipments, have been forced to fasten the needed articles for their trips in all sorts of ways to the car, frequently to the detriment of the car and the articles being transported and also detracting from the appearance of the automobile. While this is true with respect to all sorts of luggage, it is peculiarly true with respect to those traveling to engage in winter sports or on summer camping expeditions.

So far as I am aware, no entirely satisfactory means has been provided for transporting such articles as skis which are of relatively great length and are awkward to secure satisfactorily to the outside of an automobile. In accordance with my invention, I provide a sheet-like member which is preferably of some flexible textile material that is adapted to be laid flatwise on the top of an automobile and to be secured detachably in such position without injuring the automobile, the said sheet-like member being provided with means whereby a plurality of sets of skis or other objects may be readily and detachably secured in or to the said member. Desirably the member itself is of such construction that after it has been unfastened from the automobile top, it may be rolled up with the sets of skis therein and carried under the arm.

Referring more particularly to the drawing, the flexible sheet-like member is represented at 1 in the several figures. It is preferably of some sufficiently thick but flexible textile material, though it may be formed of rubber or some rubber-like material. Neither wood nor metal would be satisfactory for my purpose. My said sheet-like member 1 has the characteristic of a mat or somewhat thin rug, which, however, must be devoid of harsh or sharp portions or projections that might scratch the top of the automobile or injure the skis. The said sheet-like member 1 is preferably of about the length of a pair of skis or somewhat less, in which case the skis can project from the rear end thereof, as indicated in Fig. 3. The said member 1 is intended to be applied flatwise to the top of an automobile, which I have indicated in part at 2 in Fig. 3. Inasmuch as most automobile tops at the present time are at least slightly rounded at the back part thereof, I have indicated a slight curvature in Fig. 2. Irrespective, however, of the precise shape or form of the automobile top, the member 1 may be applied flatwise thereto and if necessary a small flexible roll such as 3 may be inserted between the under side of the member 1 and the top 2 of the automobile. If the top of the car is more markedly rounded, as in the present so-called streamline type, the roll 3 would be of large diameter or would be positioned further forward than as shown in Fig. 3. The said roll 3 may be any article that may conveniently be positioned at the point indicated without marring the automobile top, or it may be secured at one end as by a strap to the member 1, so as to be capable of being rolled up therewith, in position parallel with the sets of skis.

The said member 1 is provided with means for holding a plurality of sets of skis, one of which is indicated in dotted lines at 4 in Fig. 1. While any suitable means may be provided I preferably provide a series of ski-end receiving formations or pockets 5 in any suitable manner, as by turning an end of the member 1 back upon itself, as indicated in Fig. 4, and stitching the same thereto transversely of the member 1, as indicated at 6 in Fig. 4. Desirably I provide as many as seven pockets 5 which preferably are separated from each other, as indicated at 7 in Fig. 1 by stitching or otherwise. Each pocket should be of sufficient length to receive securely one end of a pair of skis and of sufficient size for that purpose.

In order to secure the skis in their position inside the pockets, I provide any suitable cooperating means. In the present embodiment of the invention, the following means are provided, but it is to be understood that any other suitable means may be employed instead. At some suitable point somewhat removed from the mouth of the pockets 5, as, for example, about mid-length of the member 1, I provide a canvas or other suitable strap 8 which is in length sufficient to extend from edge to edge of the member 1 and is desirably secured thereto either throughout its entire length or at suitable intervals. To the said strap 8 I attach a series of rings 9, here shown as eight in number, being one for each pocket or ski-end receiving formation plus one additional outside ring, at the right in Fig. 1, for use in securing the carrier in rolled form. The said rings 9, which may be of any suitable metal or other material that will not mar the skis, are themselves secured to the strap 8 as by means of cross rows of stitching 10 at each side of each ring. Also to each ring 9, I attach a short cord or strand 11. Each cord 11 is of sufficient length to extend from one ring 9 through the next adjacent ring to which it may be tied after having been positioned over or around one set of skis.

Thus, I provide as many cords 11 as there are sets of skis provided for, in this instance, seven. Desirably also I provide at or near the end of the member 1 remote from the pockets 5 another transversely extending strap 12 that may be similar in all respects to the strap 8. It is provided with rings 13 similar to the rings 9 and desirably secured in the same way as said rings 9. I also provide cords or strands 14 similar to the cords 11 and for the same purpose.

Any suitable means may be provided for securing the member 1 with its skis flatwise upon the top of the automobile. For this purpose I have represented four rings 15, 16, 17, 18, one at each extreme corner of the member 1. The rings 15, 16 may be secured directly to the corners of the member 1 or to a reinforcing strap such as indicated at 19 and extending across the end of the member 1. The rings 17, 18 may be secured to the ends of the strap 12, which carries the rings 13. I may also provide means by which the member 1 may be secured at a point midway between the rings 17, 18, as, for example, by an additional ring or by an additional cord.

In order detachably to secure the complete ski mat or carrier in position upon the automobile, I provide wires or other flexible pieces 20, here shown as four in number, one extending from each of the rings 15, 16, 17, 18. If wires are employed, I prefer to wrap or cover them with some material to prevent marring the automobile. I have also indicated a separate or additional cord 21 which may extend from one of the rings 13 and which is long enough to be secured to the carrier for the spare tire or to the rear rack or in any other suitable manner.

The wires or other suitable means 20 may be secured detachably to any suitable part of the automobile as, for example, to the handles of the door as by being wrapped thereabout. Or if desired and as indicated in Fig. 3, I may provide a special pin for a hinge of each door, such pin having a ring formed therewith. In Fig. 3, I have indicated a hinge at 22 and its pin 23 provided with a ring 24 preferably integral therewith and through which the wire or other strand or part may be passed and detachably secured.

It will be observed that when the member 1 has been unfastened from the automobile, it may be rolled up on a longitudinal axis with all the skis in position therein and carried under the arm. For such purpose, I may provide additional strands attached to an edge or some other part of the member 1, so that when said member has been rolled up, the said strands may be tied about the rolled up member 1. The member 1, while preferably of the length indicated, may be made shorter, so that it may be secured to the top of an automobile of the coupe type. In other words, my invention is not restricted to a ski made of the proportions shown.

Having thus described one illustrative embodiment of my invention, it is to be understood that although specific terms are employed, they are used in a generic and descriptive sense and not for purposes of limitation, the scope of the invention being set forth in the following claims.

1. A carrier for skis comprising a flexible mat-like sheet element of generally rectangular form positionable flatwise upon an automobile roof and constructed to be rolled up with the carried objects, said element being sufficiently flexible to conform itself throughout its area to the contour of the roof, ski-end receiving pockets across one end portion of the mat-like element, one or more series of ties transversely of said element and cooperating tie-receiving means for securing the free ends of the ties in position to retain the skis flatwise upon the mat-like element and in general longitudinal parallelism with it, and flexible elongated means projecting from the mat-like element and adapted to be secured to convenient parts of an automobile below its roof for readily removably attaching the carrier in position flatwise on the automobile roof.

2. A carrier for skis comprising a textile mat of generally rectangular form positionable flatwise upon an automobile roof, said mat being sufficiently flexible to conform itself throughout its area to the contour of the roof, said mat having adjacent one end a transverse series of receiving formations for one end of each of the skis to be carried, said formations arranged to hold the skis laterally and in one direction lengthwise the skis; a series of ties transversely of the mat and cooperating tie-receiving means for securing the free ends of the ties in position to retain the skis flatwise on the mat and in general longitudinal parallelism with it, said mat adapted to be spread flatwise while apart from the automobile, for the reception and attachment of the skis and thereupon to be rolled up transversely, deposited on the automobile roof and there unrolled without displacing the skis and adapted to be reversely dismounted; and means for quickly and detachably securing the mat and its carried skis in spread position upon the automobile roof.

RAYMOND E. ASHLEY.